Jan. 4, 1944.   H. C. THOMPSON   2,338,308
MACHINE FOR THRESHING FLAX AND THE LIKE
Filed Feb. 9, 1942   4 Sheets-Sheet 1
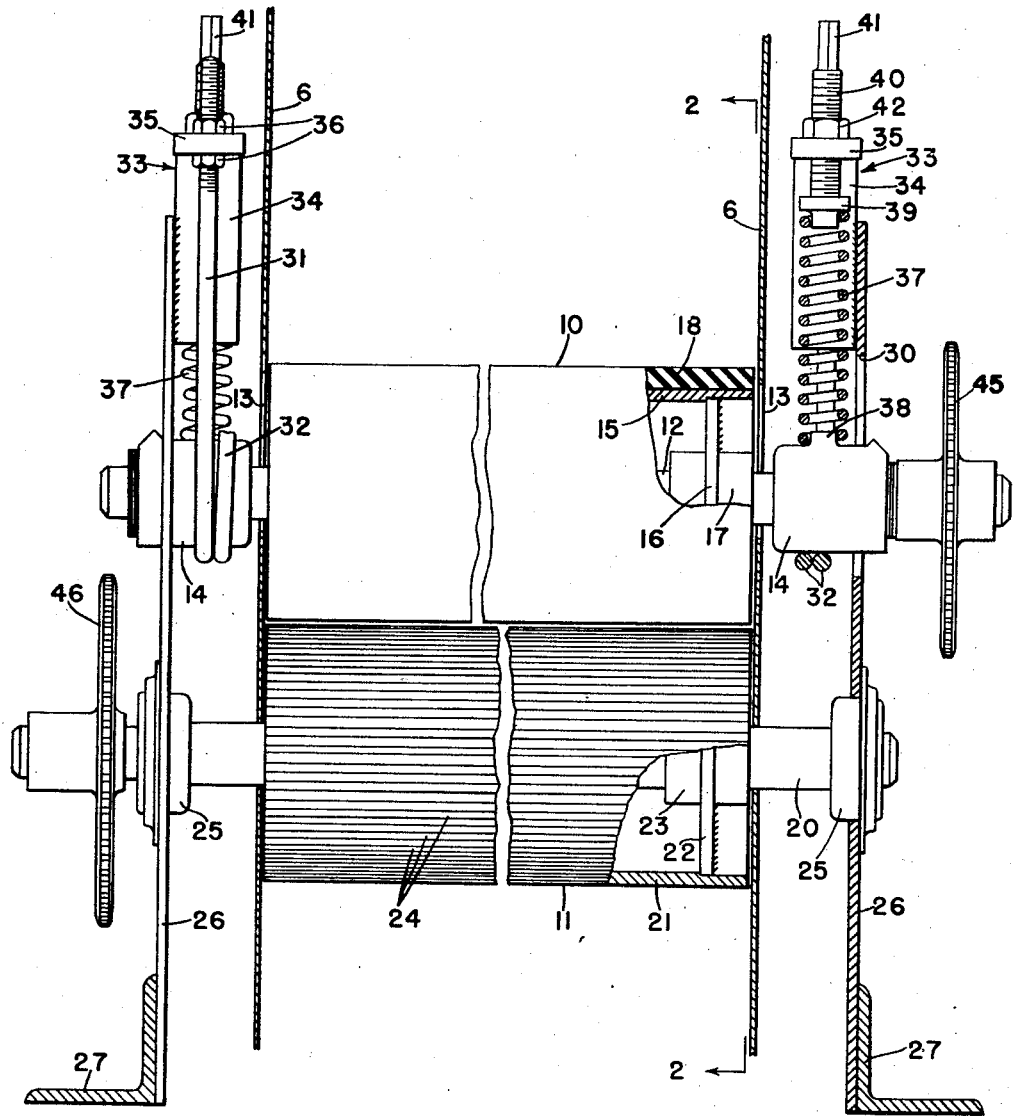
FIG. 1
INVENTOR
Hjalmar C. Thompson
ATTORNEYS Jan. 4, 1944. H. C. THOMPSON 2,338,308
MACHINE FOR THRESHING FLAX AND THE LIKE
Filed Feb. 9, 1942 4 Sheets-Sheet 2

INVENTOR
Hjalmar C. Thompson
BY
ATTORNEYS

Jan. 4, 1944.    H. C. THOMPSON    2,338,308
MACHINE FOR THRESHING FLAX AND THE LIKE
Filed Feb. 9, 1942    4 Sheets-Sheet 4

INVENTOR
Hjalmar C. Thompson
BY
ATTORNEYS

Patented Jan. 4, 1944

2,338,308

UNITED STATES PATENT OFFICE 2,338,308

MACHINE FOR THRESHING FLAX AND THE LIKE

Hjalmar C. Thompson, Moline, Ill., assignor to Deere & Company, Moline, Ill., a corporation of Illinois Application February 9, 1942, Serial No. 430,114

3 Claims. (Cl. 130—13)

The present invention relates generally to threshing machines and more particularly to threshing machines adapted to thresh flax and other crops of like nature.

The threshing of flax presents problems which are somewhat different than those encountered with other types of grain. The seeds of the flax plant are small and grow in small bolls, each of which is in the order of one-quarter to one-half inch diameter and contains a half dozen or more seeds. When these bolls are threshed by any conventional threshing cylinder without first having been broken open, a considerable number of the bolls pass through the cylinder without being threshed, and are conveyed out over the straw rack and are lost. It has long been known in the prior art that if the flax is first put through a pair of rollers ahead of the threshing cylinder, the bolls can be cracked open, with the result that the seeds are more efficiently separated therefrom in the cylinder and in the separating mechanism.

It has been found, however, that the ordinary flax crushing rolls used in the Middle West will not operate as satisfactorily in the Far West, for although the flax grown in the West is generally similar to that grown in the Middle West, the bolls are much harder and nut-like, requiring more than the usual cracking action to prepare them for the cylinder. These hard bolls of the western flax not only require an increased pressure on the rolls to break the bolls, but also require a shearing or rubbing action to loosen the pieces of boll from the seeds. The principal object of the present invention, therefore, is concerned with the provision of means for cracking and separating the seeds from the harder bolls, while effectively preventing crushing or other damage to the seeds.

Another difficulty encountered with the harder bolls is that they do not as readily pass between the rolls and therefore another object of the present invention is concerned with the provision of rolls which are of such type and nature that they engage the bolls and pass them between the rolls. I have found that two metal rolls do not have sufficient frictional qualities to engage the hard western bolls, and also have a tendency to crush the seeds and thus lose valuable oil therefrom. A pair of rubber rolls has also been tried and found unsatisfactory, for the material did not pass readily between the rolls and furthermore, since it is necessary to provide a scraper blade for removing adhering material from the lower roll, there was a tendency for the adhering material to crowd between the scraper and the rubber roll.

In the accomplishment of these objects, I have provided a pair of cooperative rolls, one of which has a rubber surface, and the other of which is provided with a metal surface having longitudinally extending grooves or flutes recessed therein. This particular combination has been found to provide the necessary pressure upon the bolls to break the latter, but without the tendency to crush the seeds. This combination of rolls has sufficient traction to draw the bolls through to feed them to the cylinder, and the lower roll, being metal, is easily kept free from adhering material by means of a scraper blade, without any tendency for the material to pack in between the blade and the roll. I have found that this combination of rolls will feed flax from a single conventional canvas conveyor or draper without positive feeding means for forcing the material between the rolls. When an upper draper is used above the conveyor and positioned in converging relation so as to positively feed material between the rolls, I have found it possible to use a lower roller having a smooth metal surface without flutes or grooves.

When working in western flax, I have found no combination of rollers which, acting with a straight crushing action, will satisfactorily break all of the hard bolls without some damage to the seeds. A further object of the present invention, therefore, is concerned with the provision of suitable crushing rolls and driving means therefor, by which the hard bolls will be effectively crushed and broken without appreciable damage to the seeds. In the accomplishment of this object, I have discovered that by driving the rubber covered roll at a speed somewhat greater than that of the metal roll, there is not only a pressure imposed upon the boll, but also a rubbing or rolling action upon the boll which more effectively opens the latter without damage to the seeds.

Another object relates to the provision of means for yieldably urging the rolls together in order to apply sufficient pressure to open the hard bolls of the western flax and a related object has to do with the provision of stop means for limiting the extent of movement of the rolls to prevent their contacting each other and thus preventing the rolls from rubbing on each other when there is no grain passing therethrough.

I have found that threshing apparatus embodying the principles of this invention can be used without alteration, for threshing many other types of crops. However, in the case of milo maize, experience has proved that the heads of the grain will not pass through the rolls, and if the upper roll is removed, there is a considerable tendency for the grain to be thrown forwardly out of the feeder house by the action of the cylinder. It is therefore still another object of the present invention to provide means for conditioning the flax threshing apparatus for threshing milo maize and other similar crops. In the accomplishment of this object I have found that an upper roll of square cross section, if substituted for the rubber roll, is very effective in gripping and feeding the milo maize into the cylinder. The roll of square cross section is preferably made of hard wood. When more than four sides are used on this roll, the rolls do not feed as well, due to the smaller clearance between the sides of the wood roll and the surface of the metal roll, whereas in the case of the square roll, the corners of the upper roll cooperate with the lower roll to obtain a firm grip upon the material, but appreciable clearance is provided just behind the point of gripping, to accommodate the cluster of seeds or kernels in the heads of milo maize.

These and other objects and advantages of my invention will be apparent to those skilled in the art after a consideration of the following description, in which reference is had to the drawings appended hereto, in which Figure 1 is a front elevational view of a pair of cooperative flax treating rolls embodying the principles of the present invention, some parts being broken away to more clearly show the details of construction;

Figure 2:
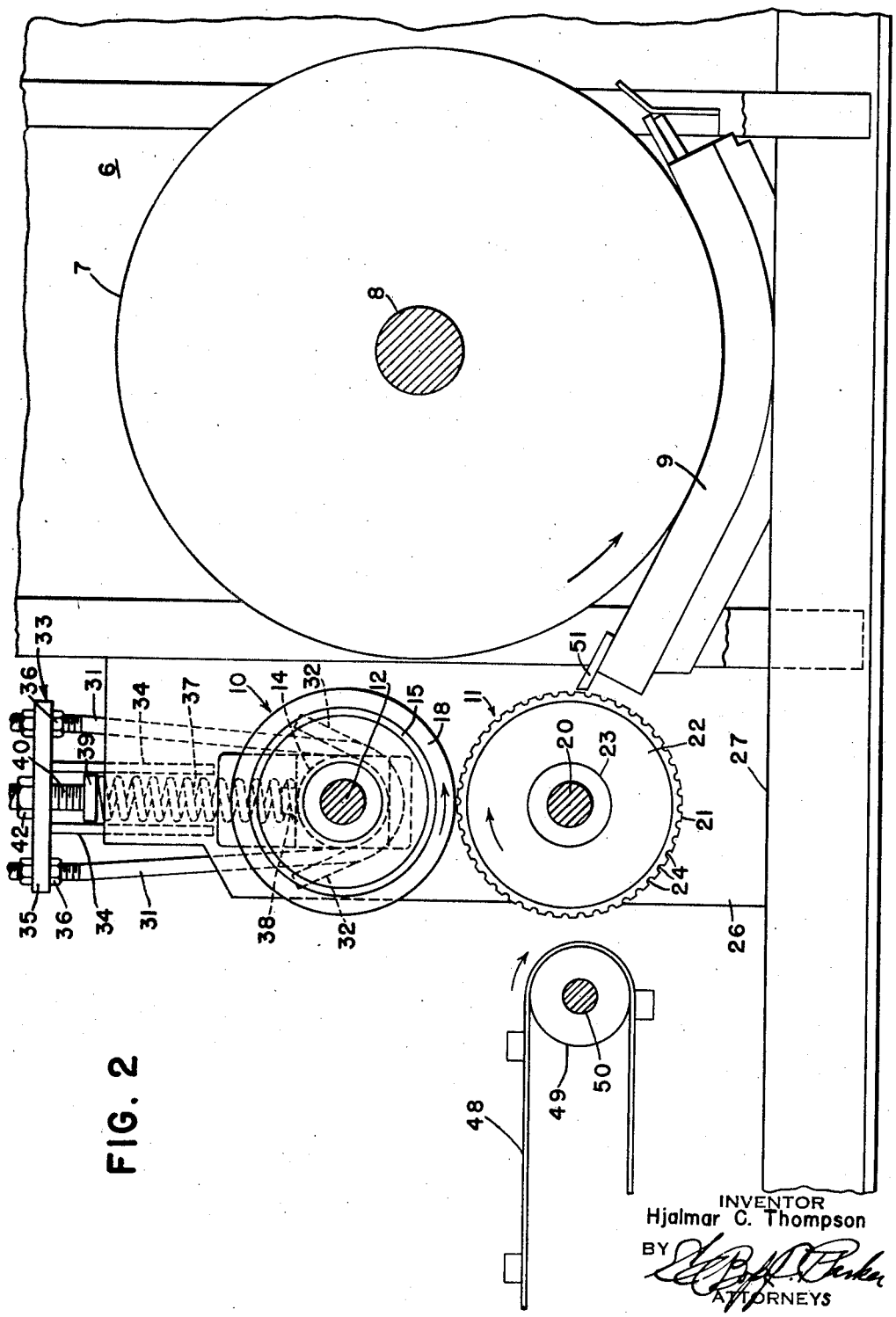
Figure 2 is a side elevational view taken in section along a line 2—2 in Figure 1 and showing the relation of the rolls to the threshing cylinder and to the feeder conveyor.

Referring now to the drawings and more particularly to Figures 1 and 2, the threshing machine comprises a housing including a pair of side walls 6, within which is mounted a threshing cylinder 7 on a shaft 8, the latter being journaled for rotation within the housing. The threshing cylinder 7 can be of any suitable type known in the art, and beneath the threshing cylinder is disposed a concave 9 of any suitable type, the details of which do not form a part of the present invention.

Disposed ahead of the threshing cylinder 7 and concave 9, for feeding grain thereto, is a pair of upper and lower cooperative rolls 10, 11, respectively. The upper roller 10 comprises a transverse supporting shaft 12, extending outwardly through vertical slots 13 in the sides 6 of the housing and journaled in bearing blocks 14 on the outside of the housing. A metal cylinder 15 is mounted on a pair of laterally spaced disks 16, which are fixed on hubs 17 mounted on the shaft 12 within the housing 6 in laterally spaced arrangement. The outside of the cylinder 15 is covered with a layer of rubber 18, preferably vulcanized thereto, and having a substantially smooth outer surface. The hardness of the rubber may be in the order of 63 Shore durometer.

The lower roll 11 comprises a shaft 20 disposed directly beneath the shaft 12 of the upper roll and substantially parallel thereto. A steel cylindrical drum 21 is supported on a pair of laterally spaced disks 22 carried on hubs 23 fixed to the shaft 20 between the walls 6 of the housing. The outer surface of the drum 21 is recessed to provide a plurality of closely spaced narrow longitudinally extending grooves 24, preferably hemi-cylindrical in shape, although other shapes may be found effective. The shaft 20 of the lower roller 11 is journaled, at opposite ends thereof, respectively, in a pair of bearings 25, which are mounted in fixed position in a pair of upright supports 26, which are fixed to the longitudinal frame members 27 of the machine.

The bearings 14 for the upper roller 10 are slidable vertically in slots 30 in the two supporting members 26. Each of the bearings 14 is supported on a pair of hook-shaped hangers 31, the lower hooked ends 32 of which extend beneath the bearings 14 from opposite sides thereof, respectively. The hangers 31 are mounted on a yoke 33 comprising a pair of vertical supporting legs 34 fixed, as by welding, to the upper portion of the supporting members 26, and a transverse beam portion 35 extending parallel to the walls 6 in opposite directions from the supporting portions 34. The beam portion 35 of each yoke 33 is provided with a suitable aperture at each end thereof to receive the upper end of each of the hangers 31, which is threaded to receive a pair of lock nuts 36, by means of which the hangers 31 may be adjusted vertically relative to the yoke 33. Thus, the hangers 31 serve as limit stops for the upper roll 10 and define the lowest position of the latter, although it may move upwardly therefrom when grain is passed between the rolls. Preferably, the nuts 36 are adjusted so that the hangers prevent the rolls 10, 11 from contacting each other by allowing a small clearance, say 1/64 of an inch between the rolls. The upper roll is urged downwardly toward the lower roll 11 by means of a pair of compression coil springs 37, the lower ends of which encircle a boss 38 in the upper surface of the bearing 14, the springs 37 extending upwardly between the supporting legs 34 of the yoke 33. The upper end of each of the springs 37 bears against a seat member 39 on the lower end of a threaded adjusting shaft 40, which extends upwardly through a centrally disposed aperture in the transverse beam portion 35 of the yoke 33. The upper end of each of the shafts 40 is provided with a squared portion 41 to receive an adjusting wrench, for the purpose of turning the threaded shaft 40 within the aperture in the yoke 33, which is tapped for this purpose. The shaft is locked in adjusted position by means of a lock nut 42, which can be tightened down against the top of the yoke 33.

Each of the shafts 12, 20 is provided with a drive sprocket 45, 46, disposed on opposite sides of the body, respectively, and each of the sprockets 45, 46 is driven by a suitable chain, which transmits power from the source which drives the machine.

The drive mechanism to the two rolls including the sprockets 45, 46, is arranged so that the upper roll travels at a slightly greater speed than the lower roll, and both rolls travel at a considerably slower speed than the threshing cylinder 7. For example, I have found that under certain conditions satisfactory results were obtained by driving the upper rubber roll at approximately 228 R. P. M., and the lower roll at 203 R. P. M. This results in a higher peripheral speed of the rubber roll, which tends to impart a slight rolling or grinding movement to the flax bolls as they pass between the rolls, and this has been found to be very effective in breaking open the hard western bolls.

The flax is fed to the rolls by means of a flexible endless type conveyor 48, trained around a driving roller 49, which is supported on a shaft 50. The conveyor 48 brings the flax into contact with the two rolls 10, 11, and the rubber surface cooperating with the fluted metal surface is very effective in grasping the stalks and bolls and passing them therebetween to the threshing cylinder 7. A scraping plate 51 is fixedly supported on the forward end of the concave 9 and is adapted to strip off any material that tends to adhere to the lower roll 11. By virtue of the fact that both the roll 11 and the stripper plate 51 are made of metal, the crushed material tends to scrape or peel readily off the roll, rather than to become wedged between the roll and the scraper plate 51, as was the case when a rubber roll was used in place of the lower metal roll.

As stated above, the peripheral speed of the rolls 10, 11 is appreciably slower than the peripheral speed of the threshing cylinder, which latter operates at comparatively high speeds of 800 to 1200 R. P. M. and greater, as is well-known to those skilled in the art. This has the effect of retarding the feeding of grain to the threshing cylinder to prevent the latter from choking and overloading.

Figure 3:
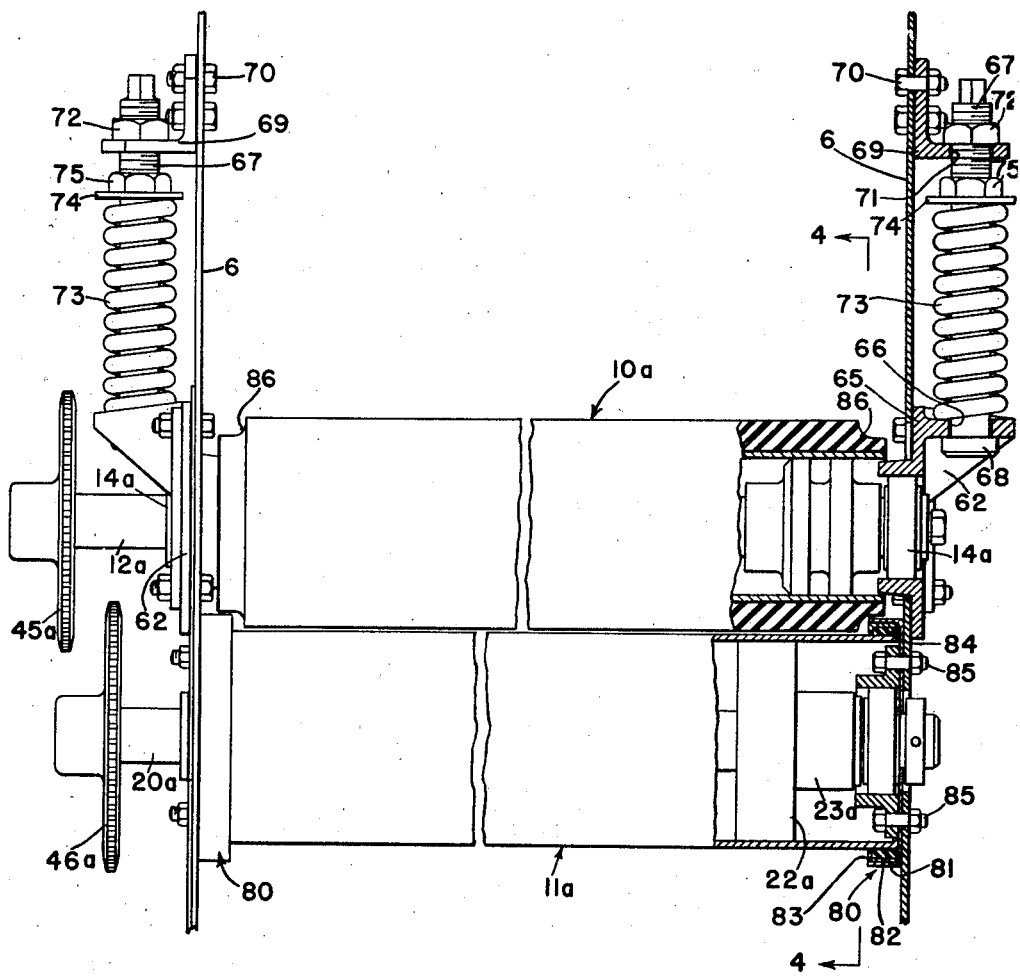
Figure 3 is a front elevational view of a modified pair of flax treating rolls.
Figures 4, 5:
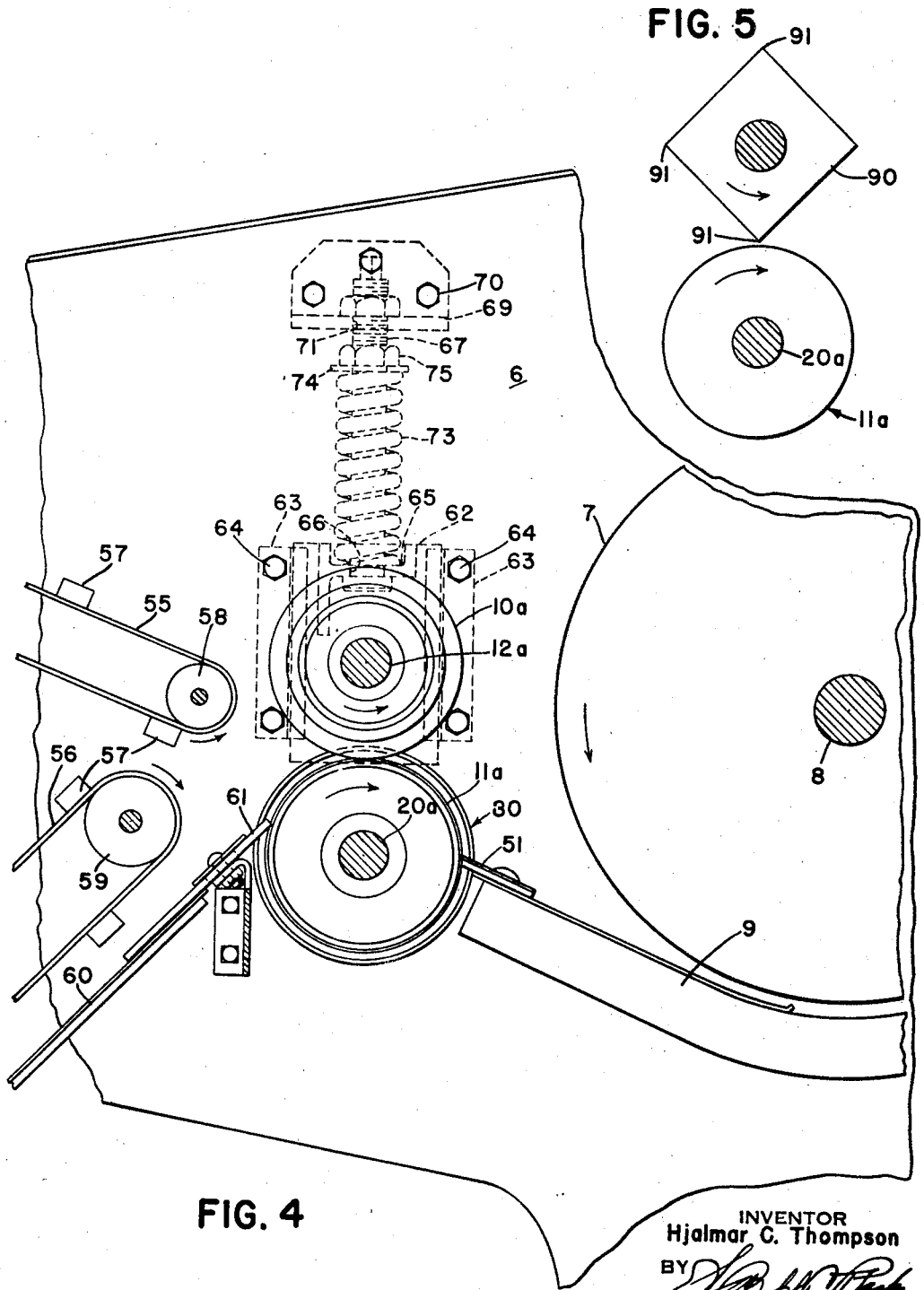
Figure 4 is a side elevational view taken in section along a line 4—4 in Figure 3, showing an arrangement in which a positive feed is employed for feeding the flax to the rolls.
Figure 5 is an end view of a pair of rolls in which a square roll has been substituted for the upper rubber surfaced roll, especially adapted for operation in milo maize.

Referring now more particularly to Figures 3, 4 and 5, in this modification, the metal roll 11a has a smooth outer surface, for the reason that in this embodiment, the grain is fed more positively to the rolls 10a, 11a by means of a pair of rearwardly converging flexible belts or drapers 55, 56 having transverse slats 57. The belts are trained over a pair of rollers 58, 59, respectively, journaled adjacent the rolls 10a, 11a and rotatable in relatively opposite directions to drive the adjacent sides of the draper rearwardly toward the rolls. The lower draper 56 can be the main platform conveyor of a combine of the straight-through type, well-known to those skilled in the art. A platform or deck 60 is disposed beneath the lower draper 56 and is provided along its rear edge with a flexible sealing strip 61, which bears against the rotating lower roll 11a and prevents grain from dropping between the platform 60 and the roll 11a.

The bearings 14a in which the upper roller shaft 12a is journaled, are carried in supports 62, which are slidable vertically on the side walls 6 of the housing and are retained thereon by a pair of retainers 63 fixed by bolts 64 to the walls 6, between which each support 62 is vertically slidable. Each of the supports 62 is provided with a horizontal flange 65 extending outwardly therefrom and provided with an aperture 66 therein, through which extends a hanger bolt 67. Each bolt 67 has a head 68 on which the flange 65 rests, and the bolt is suspended from a supporting clip 69, fixed by bolts 70 to the side wall of the housing. The clip 69 is provided with a horizontal flange which is apertured and threaded at 71 to receive the upper end of the bolt 67, the latter being threaded to engage the aperture 71 and is locked against rotation in adjusted position by a lock nut 72, which bears upon the upper surface of the horizontal flange of the clip 69. Each of the bolts 67 can be adjusted vertically within the aperture 71 to determine the clearance between the rolls 10a, 11a, to provide for operation of the rolls at different speeds without contacting each other. The upper roll 10a is urged downwardly to the lower limit set by the head 68 of the bolt 67 by means of a compression coil spring 73, which embraces each of the bolts 67, bearing downwardly upon the top of the flange 65, and reacting against a washer 74 and nut 75, which is threaded on the bolt 67. The pressure of each spring can be adjusted by moving the nut 75 vertically along the bolt.

Grain is prevented from entering the hollow metal cylinder 11a by means of a sealing device 80 at each end of the roll 11a. The sealing device 80 comprises a cup-shaped retainer 81, within which is pressed an annular retainer 82 having a flange 83 for holding an annular sealing member 84 in contact with the outer cylindrical surface of the roll 11a. The retainer 81 is secured to the side wall 6 of the housing by means of bolts 85. The rubber roll 10a is notched at each end at 86 in order to clear the sealing member 80.

The rolls 10a, 11a are driven in relatively opposite directions, with the upper rubber covered roll 10a running at a slightly greater speed than the lower roll 11a by means of a suitable driving mechanism including a pair of sprockets 45a, 46a mounted on the shafts 12a, 20a, respectively. I have successfully operated a machine constructed according to the details of Figures 3 and 4, with the upper roll running at 372 R. P. M. and the lower roll running at 360 R. P. M.

This machine can be used without alteration to thresh various other crops, but I have found that when the machine is used for threshing milo maize, better results can be obtained by using the combination shown in Figure 5, of a lower smooth metal roll 11a and an upper hard wood roll of square cross section, indicated at 90. As will be evident to those skilled in the art, the corners 91 of the square roll 90 are effective in feeding the grain to the cylinder 7.

I claim:

1. In a machine for threshing flax and the like, the combination of a pair of upper and lower cooperative rotatable rolls, said upper roll having a rubber surface and said lower roll having a metal surface, means for feeding harvested flax between said rolls means for driving said rolls in relatively opposite directions, with said rubber surfaced roll rotating at a higher peripheral speed than said metal surfaced roll to impart a rubbing action upon the grain thereby cracking and partially removing the bolls from the seeds, spring means for yieldably urging said upper roll downwardly toward said lower roll, stop means for preventing said rolls from contacting each other to maintain a certain minimum clearance therebetween while permitting said rolls to separate against the action of said yieldable means, and a scraper blade supported adjacent said metal roll to scrape any adhering material therefrom.

2. In a machine having a cylinder for threshing flax and the like, the combination of a pair of upper and lower cooperative rotatable rolls disposed ahead of said cylinder, said upper roll having a rubber surface and said lower roll having a metal surface provided with shallow axially extending grooves or recesses therein, means for driving said rolls in relatively opposite directions, said upper roll being shiftable toward and away from said metal roll, spring means for yieldably urging said upper roll downwardly toward said lower roll, stop means for preventing said rolls from contacting each other to maintain a certain minimum clearance therebetween while permitting said rolls to separate against the action of said yieldable means, and a scraper blade supported adjacent said metal roll to scrape any adhering material therefrom.

3. In a machine for threshing flax and the like, the combination of a pair of upper and lower cooperative rotatable rolls, said upper roll having a rubber surface and said lower roll having a smooth metal surface, means for driving said rolls in relatively opposite directions with said rubber surfaced roll rotating at a higher peripheral speed than said metal surfaced roll to impart a rubbing action upon the grain thereby cracking and partially removing the bolls from the seeds, said upper roll being shiftable toward and away from said metal roll, spring means for yieldably urging said upper roll downwardly toward said lower roll, stop means to prevent said rolls from contacting each other, a scraper blade engaging said metal roll, and a pair of upper and lower endless conveyor means converging toward said rolls for compressing and feeding grain to said rolls to be treated thereby.

HJALMAR C. THOMPSON.